United States Patent
Braden

(10) Patent No.: US 7,552,770 B2
(45) Date of Patent: Jun. 30, 2009

(54) HEAVY WAX STIMULATION DIVERTING AGENT

(75) Inventor: John C. Braden, Anchorage, AK (US)

(73) Assignee: ConocoPhillips Company, Houston, TX (US)

( * ) Notice: Subject to any disclaimer, the term of this patent is extended or adjusted under 35 U.S.C. 154(b) by 131 days.

(21) Appl. No.: 11/249,576

(22) Filed: Oct. 13, 2005

(65) Prior Publication Data

US 2007/0084600 A1    Apr. 19, 2007

(51) Int. Cl.
*E21B 43/04* (2006.01)
*E21B 43/14* (2006.01)

(52) U.S. Cl. ............... 166/278; 166/191; 166/305.1; 166/313

(58) Field of Classification Search ............ 166/278, 166/191, 305.1, 313
See application file for complete search history.

(56) References Cited

U.S. PATENT DOCUMENTS

| | | | | |
|---|---|---|---|---|
| 3,316,965 A | * | 5/1967 | Watanabe | 166/280.1 |
| 3,455,390 A | * | 7/1969 | Gallus | 166/295 |
| 3,979,305 A | | 9/1976 | Fischer et al. | |
| 5,165,476 A | | 11/1992 | Jones | |
| 5,269,375 A | * | 12/1993 | Schroeder, Jr. | 166/278 |
| 7,296,625 B2 | * | 11/2007 | East, Jr. | 166/290 |

OTHER PUBLICATIONS

Baker Oil Tools Catalog, Bakerweld®Screen, description and specifications, published prior to Oct. 13, 2005.
"Remedial Cleanup, Sand Control & Other Stimulation Treatments," by Howard B. Bradley, et al, pp. 56-8 through 56-9, Petroleum Engineering Handbook, Third Printing, Society of Petroleum Engineers, Richardson, TX, U.S.A., published prior to Oct. 13, 2005.
"Sand Control," Chapter 8, Gravel-Pack Placement, by W. L. Penberthy, Jr. and C. M. Shaughnessy, pp. 45-57, Fourth Printing—2002, Henry L. Doherty Memorial Fund of AIME, Society of Petroleum Engineers, Richardson, TX.

\* cited by examiner

*Primary Examiner*—Jennifer H Gay
*Assistant Examiner*—Nicole Coy

(57) ABSTRACT

A method and composition for isolating a selected subterranean formation in a subterranean formation having a gravel pack over a plurality of producing zones.

17 Claims, 4 Drawing Sheets

HEAVY WAX STIMULATION DIVERTING AGENT

FIELD OF THE INVENTION

The present invention relates to a method and composition for isolating a selected subterranean zone in a subterranean formation having a gravel pack over a plurality of producing zones.

BACKGROUND OF THE INVENTION

In many oil and gas production operations, it is found that after drilling a well from the earth's surface through the subterranean zones of interest, one or more of the zones may produce undesirable quantities of particulate matter so that the well becomes plugged or so that if entrained to the surface the particulate matter constitutes a problem with the fluid-handling equipment. In such instances, it is common to use a gravel pack which comprises a layer of gravel positioned around an inner circumference of the well to prevent the flow of particulates from the formation with the produced fluids. A wide variety of techniques are used to position the gravel in the well. A number of such techniques are disclosed in *Petroleum Engineering Handbook*, Editor-in-Chief Howard B. Bradley, third printing, Society of Petroleum Engineers, Richardson, Tex., U.S.A., 1998, pages 56 and 58 and Chapter 8, "Gravel Pack Placement", pages 45-57.

Such gravel packing techniques typically utilize a gravel layer positioned around the inside of the circumference of the well over a producing area or areas. Typically the gravel is held in place by a screen. A variety of types of screens may be used. One such screen is a BAKERWELD screen marketed by Baker Oil Tools. This screen includes a wire wrap screen positioned around a perforated base pipe. The wire wrap screen is typically offset from the perforated base pipe. The production tubing normally extends to the top of the gravel pack assembly. The perforated base pipe acts as the tubing within the perforated intervals and as a substrate to wrap the wire, creating a screen around the perforated base pipe. An annular offset is formed between the perforated base pipe and the wire wrap screen. The production tubing does not necessarily extend into the perforated base pipe. Other types of screens typically use the wire wrap and may or may not also include layers of woven screen, sized particles or both.

When it is necessary to treat one of a plurality of formations positioned in a gravel pack which covers a plurality of formations, it has been found that it is difficult to achieve the isolation of a single formation or a group of formations since there is an annular space (gap) between the outside of the perforated base pipe and the inside of the screen surrounding the perforated base pipe. This gap extends around the outside of the base pipe and permits the flow of material through the annular space, even when the base pipe is blocked and when the gravel pack is blocked.

SUMMARY OF THE INVENTION

Since it is necessary in some instances to isolate producing formations, which produce through a gravel pack which covers a plurality of formations, effective methods have been sought to effectively plug the perforated base pipe, the gap and the gravel pack above and below and above or below the formation of interest. It is now been found that an effective plug can be produced by treating a selected one of a plurality of subterranean formations penetrated from an earth surface by a well with a gravel pack comprising gravel positioned around an outer circumference of the well and over the subterranean formations with a screen inside the gravel, the well further including a perforated base pipe in fluid communication with an inside of the screen and the earth surface, the method comprising: positioning at least one packer in the tubing to isolate at least the selected one of the subterranean formations; positioning a quantity of a particulate mixture consisting essentially of a wax having a melting point above the treatment temperature of the selected subterranean formation and a finely-divided particulate metal salt, the mixture having a specific gravity greater than water above the at least one packer; and, injecting a quantity of a treating material into the well and into the selected subterranean formation.

Further, a method is disclosed for isolating a selected one of a plurality of subterranean formations penetrated from an earth surface by a well with a gravel pack comprising gravel positioned around an outer circumference of the well and over the subterranean formations with a screen inside the gravel, the well further including a perforated base pipe in fluid communication with an inside of the screen and the earth surface, the method comprising: positioning at least one packer to isolate at least the selected one of the subterranean formations; and, positioning a quantity of a particulate mixture consisting essentially of a wax having a melting point above the treatment temperature of the selected subterranean formation and a finely-divided particulate metal salt, the mixture having a specific gravity greater than water above the at least one packer.

The invention further comprises a composition for shutting off a well. The composition consists essentially of a mixture of a wax having a melting point above about 125° F.; and, a finely-divided particulate metal salt, the mixture having a specific gravity greater than water.

DESCRIPTION OF PREFERRED EMBODIMENTS

In the discussion of the Figures, the same numbers will be used throughout to refer to the same or similar elements.

Figure 1:
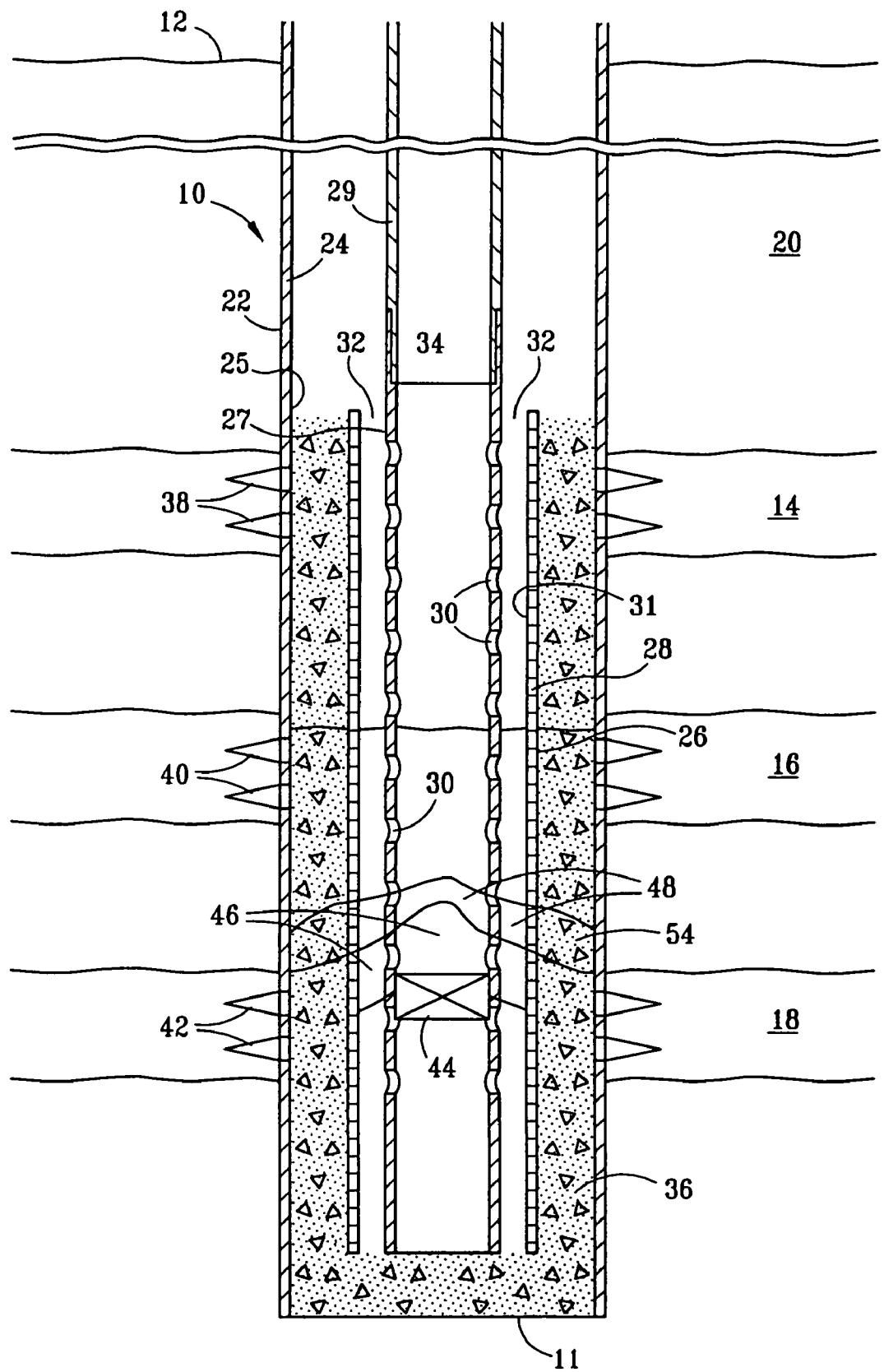
FIG. 1. shows a well, including a gravel pack over three producing subterranean formations, with the gravel pack comprising a gravel layer contained in place by a screen with a gap existing between the screen and a perforated base pipe with a plug in place according to the present invention.

In FIG. 1 a well 10 is shown extending from an earth surface 12 through an overburden 20 and through producing formations 14, 16, 18 to a well bottom 11. It will be understood that the well bottom 11 could be a substantial distance below formations 14, 16, and 18, as known to those skilled in the art.

Well 10 comprises a wellbore 22, including a casing 24 having an inside diameter 25. Casing 24 is typically cemented in place as known to those skilled in the art. A perforated base pipe 26 having an outside 27 and perforations shown as holes 30 (which may be slots) extends through a screen 28 and is connected to a production tubing 29 at a connection 34 with production tubing 29 being in fluid communication with the earth surface and producing formations 14, 16 and 18. A gravel pack comprising gravel 36 positioned around the inside 25 of casing 24 is positioned over perforations 38, 40 and 42 into formations 14, 16 and 18 respectively. The gravel is held in place by a screen 28, which may be any suitable screen such as the Baker Oil Tools screen discussed above. Though the screen is connected to the base pipe, an annular space 32 (gap) is present between the outside of the perforated base pipe 26 and an inside 31 of screen 28. In operation, fluids flow from formations 14, 16 and 18. Typically in formations which require a gravel pack, solids are produced with the fluids recovered from these formations if no gravel pack is used. In many instances it is desirable to be able to selectively treat one or more of the formations while isolating the other formations. In FIG. 1 a packer 44 is positioned to isolate formation 18 so that formations 14 and 16 can be treated.

A plug is formed by positioning a retrievable packer 44 in the perforated base pipe 26 at a level below a bottom of formation 16. When such plugs are used, a treating solution which is pumped into the well will pass through an annulus 32 between inside 31 of screen 28 and the outside of perforated base pipe 26 and through perforations 38, 40 and 42, thereby treating formation 18 as well as formations 14 and 16. According to the present invention, this difficulty is avoided by placing a mixture 46 comprising a wax and a metallic salt over plug 44 in an amount sufficient to deform outwardly over plug 44 through openings in the perforated base pipe 26 and into gap 32 to plug perforated base pipe 26 and gap 32 at a point below the bottom of formation 16 in the well above packer 44. Once the perforated base pipe 26 and the gap 32 have been plugged, a sealing agent such as a solidifying liquid, such as sodium silicate, urethane polymers or epoxy resins; a highly viscous liquid, such as acrylic gels, urethane gels or other natural or synthetic polymeric liquids; and, a finely ground slurry, such as micro-fine cement, silica flour or other finely ground solids, or the like can then be injected to settle into and plug the gravel pack, as shown.

Figure 2:
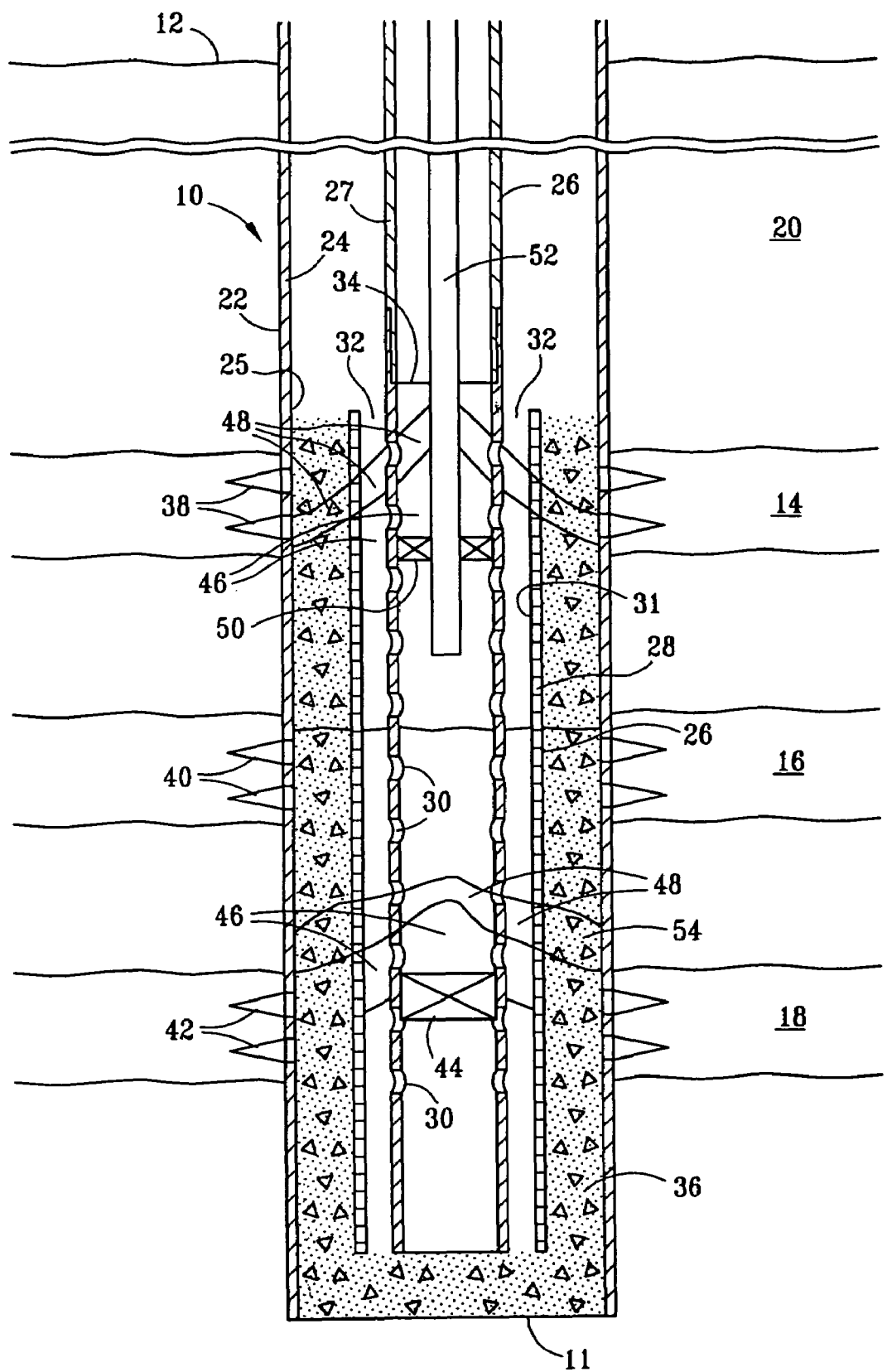
FIG. 2. shows a further embodiment of the present invention wherein a pair of plugs are in position to isolate a selected subterranean formation.

In FIG. 2 a similar treatment system is shown, but in this instance two packers are used to isolate zone 16. A second packer 50 is positioned above the top 48 of formation 16 and a tubing 52, such as coiled tubing or the like, is used to inject a treating solution into formation 16. In FIG. 1 the injected treating solution will pass into formations 14 and 16. The treating solutions may be water shut-off materials, acidizing materials, scale inhibitors, corrosion inhibitors and the like. Substantially any well treatment known to those skilled in the art may be used after the formations which are to be isolated have been isolated according to the present invention.

Figure 3:
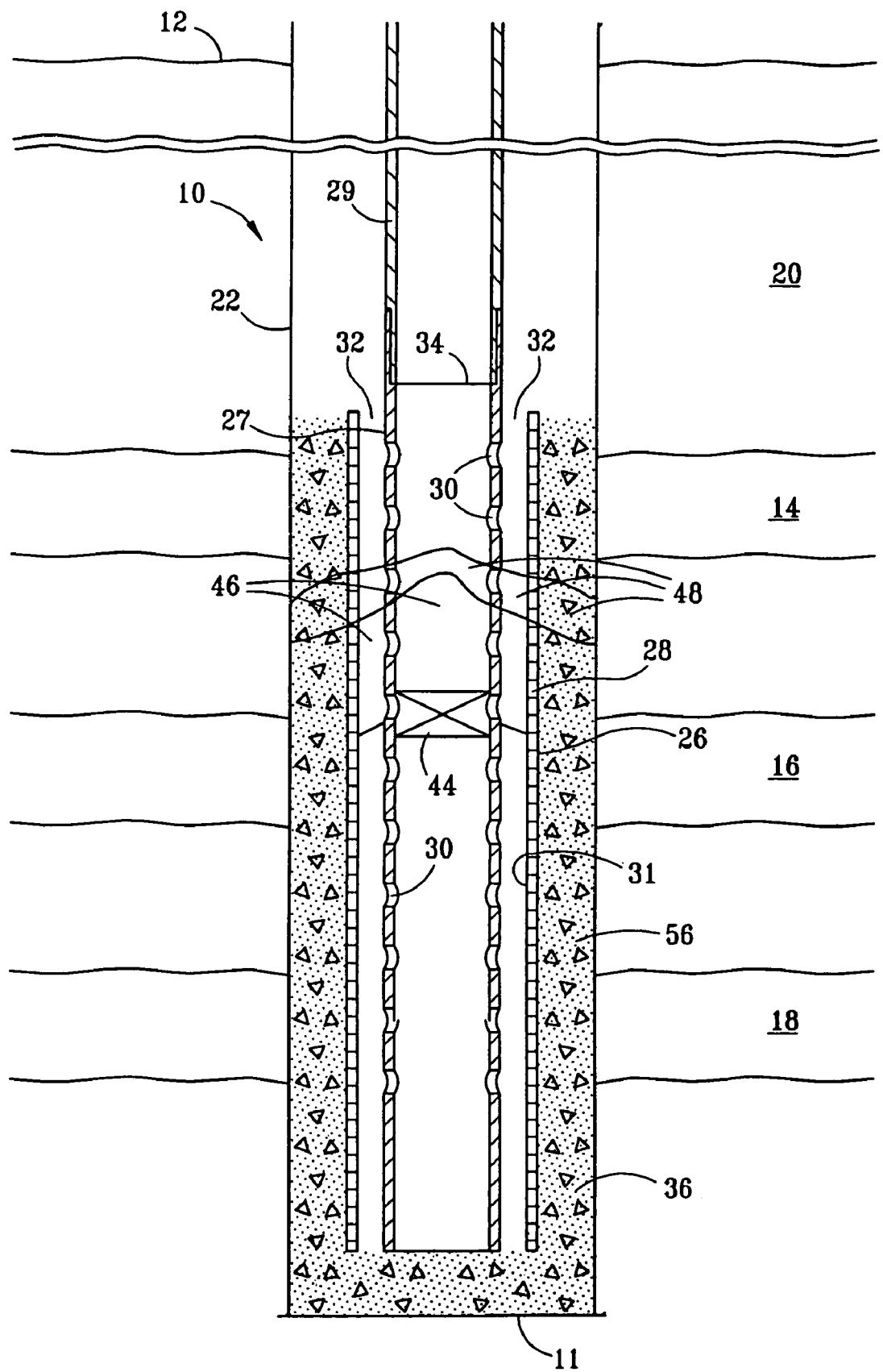
FIG. 3 shows a further embodiment of the present invention in an open-hole well.

In FIG. 3 an embodiment is shown wherein a plug according to the present invention is used to isolate formation 14 from formations 16 and 18. In this instance, an uncased (open-hole) well is shown. It is well known that gravel screens can be used in both cased and uncased wells. In either instance, the method of the present invention is effective. Once the treatment has been completed, the wax/metallic salt plug may be flushed from the well by passing a warm material into the well to warm the well to melt the wax and remove the plug or the plug may be removed by the use of a solvent, such as diesel fuel, xylene, crude oil or the like. Any suitable solvent which contains a high percentage of aromatics can be used. Desirably the calcium carbonate is very finely divided and is readily dispersed as the wax is dissolved or melted.

The wax/metal salt material is formed into pellets. Desirably the pellets are from about ⅛ to about ⅜ inches in diameter and typically are about ⅜ inches in diameter. The pellets can readily deform into the gap and against the screen. The size of the pellets can vary widely depending upon factors such as the width of the gap. In any instance, it is believed that pellets of substantially any size will deform sufficiently to plug off the base pipe annulus, the gap and the screen. The wax pellets should be smaller than the perforations in the base pipe (about 10 mm in diameter) and larger than the width of the annulus (gap 32) between the outside of the base pipe and the inside of the screen (typically about 3 mm).

Desirably the particles of the mixture can be formed by any suitable technique, such as those disclosed in U.S. Pat. Nos. 3,979,305; 3,316,965 and 3,455,390, which are hereby incorporated in their entirety by reference. The particles can vary widely in shape and size depending upon the process by which the particles are produced and the conditions under which they are to be used. Typically the particles can be spheroids, cubes, granules, buttons, flat discs, or mixtures thereof having mean diameters from about 0.1 microns to about ½ inch. Preferably the particles are from about ⅛ inch to about ⅜ inch and are spherical.

Suitable waxes are selected from a group consisting of crystalline and microcrystalline petroleum waxes, beeswax, carnuba wax, condellia wax, montan wax, fully refined petroleum waxes, long chain aliphatic hydrocarbon and oxidized hydrocarbon waxes, Fischer-Tropsch waxes, synthetic waxes and the like. Desirably, the wax is solid at room temperature and at the formation temperature and has a melting point higher (preferably at least 10° F.) than the formation temperature. Upon completion of the treatment, the formation temperature may be raised by injecting heated water or the like to melt the wax and remove the plug. Similarly, materials which are aromatic and are capable of dissolving the wax can also be used to dissolve the wax. Further the wax can be used in formations which have a temperature higher than the melting point of the wax by injecting sufficient water and the like to cool the formation. It is preferred that the wax have a melting temperature above the temperature of the formation as treated so that the wax can be removed by using a heated material or a dissolving material or by allowing a cooled formation to return to its uncooled temperature.

The metal salt is selected from the salts of Metals in Groups II, III, IV-A, V, VI, VII and VIII of the Periodic Table. A particularly preferred salt is calcium carbonate. Desirably the metal salt particles have a diameter no greater than about ⅜ inches and preferably have a diameter from about 100 to about 18 mesh, U.S sieve. The metal salt may or may not be reactive with materials such as acids and the like since the metal salt after removal of the wax is finely dispersed by the production of fluids from the formation. The mixture is accordingly readily removed once the well treatment is completed. The metallic salt and the wax may be removed by acids dispersed in aromatic-containing solvents.

Desirably the mixture of wax and metal salt has a specific gravity greater than water and in the event that the well contains brine, a specific gravity higher than the specific gravity of the brine. The amount of the calcium carbonate added to the wax is determined at least in part by the concentration of metal salt necessary to make the mixture heavier than water. Typically when calcium carbonate is used, the mixture is designed to contain from about 5 to about 30 weight percent calcium carbonate and from about 70 to about 95 weight percent wax. Preferably this mixture is also designed to have a melting point from about 125 to about 250° F. Such mixtures are designed to sink in water and deform outwardly over a packer to plug the production tubing to close the gap between the screen and the production tubing and to close the flow through the gravel in the area of the packer.

As discussed previously, plugs of this type can be used below and above a selected formation to isolate the formation for treatment by known well treating techniques.

Figure 4:
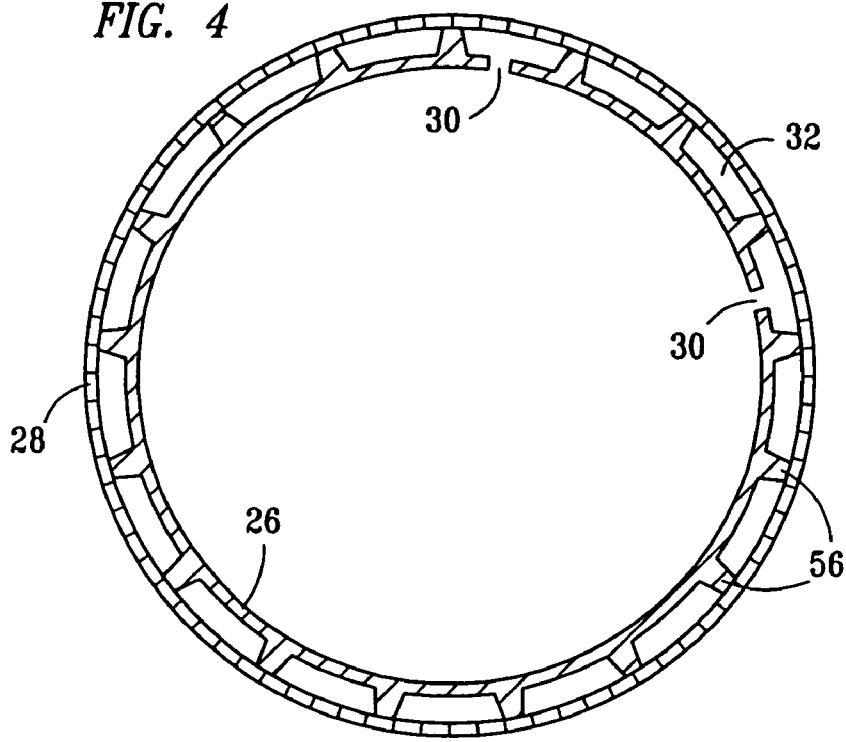
FIG. 4 shows a cross-sectional top view of a wire wrap screen including a perforated base pipe; and, FIG. 5 shows an isometric view of the top of a wire wrap screen including a perforated base pipe.

In FIG. 4, a cross-sectional top view of a perforated base pipe 26 with a wire wrap 28 is shown. Wire wrap screen 28 is separated from the outside of perforated pipe 26 by a plurality of offsets 56 which are typically about ⅛ inch in height so that the wire wrap screen is separated from the outside of the perforated base pipe 26 by a space of approximately ⅛ inch. The screen is typically welded to at least a portion of the offsets to retain the screen in position relative to the perforated base pipe. The offsets may be welded to the base pipe at their ends, along their length or otherwise secured to the base pipe as known to the art. The construction of such screens is considered to be known to the art.

Figure 5:
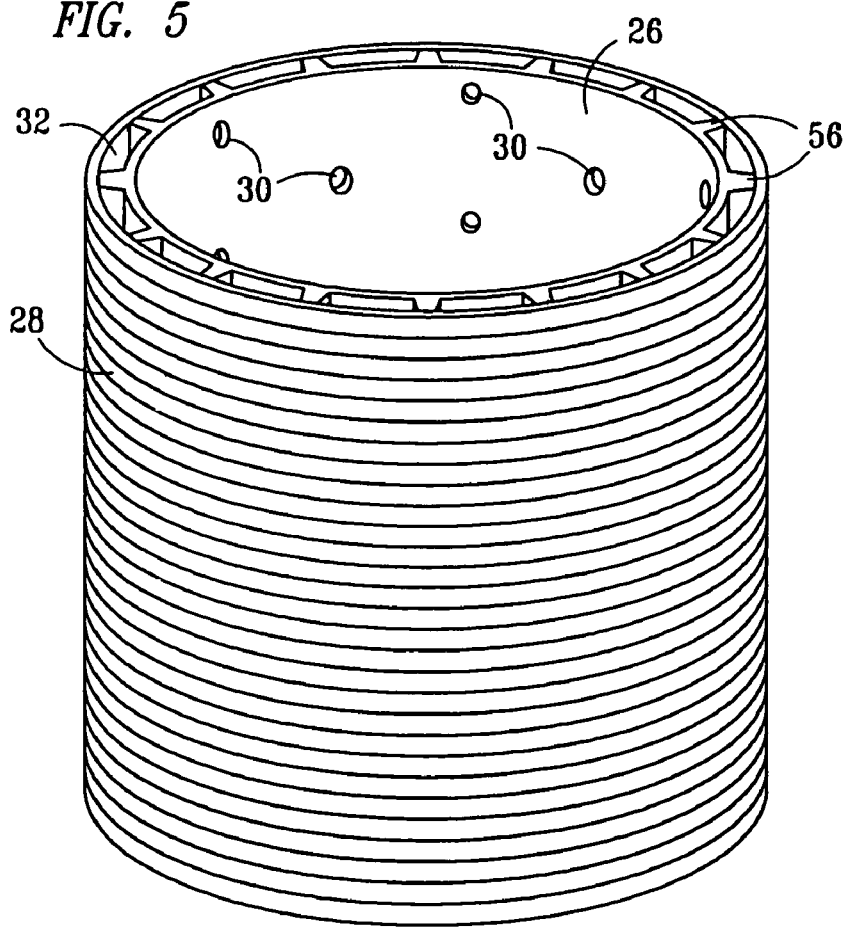

In FIG. 5 an isometric top view is shown showing the same features of the screen, including the perforated base pipe, offsets and the wire wrap screen. The annular space 32 is the space between the inside of the wire wrap screen and the outside of the perforated pipe.

The composition of the present invention can be delivered to the well as a preformed composition or it can be produced at the well site by mixing the metal salt and the wax in a suitable pelletizing system to produce the pelletized mixture. This mixture is readily injected into the well and passed downwardly to the plug in the well which stops the mixture and allows it to deform outwardly around the plug to close off flow through the production tubing and the inside of the screen and the gravel zone.

In addition to using heated materials and aromatic-containing materials to dissolve the wax, less preferred but effective solvent materials are fluorocarbons, carbon tetrachloride and the like. For environmental reasons, these materials are less preferred.

In U.S. Pat. No. 3,979,305 a fluid loss additive is disclosed comprising a wax, an oil-soluble polyhydroxy, higher fatty acid, a partial ester surface-active agent and a water dispersible surface active agent, such as polyethylene alkyl phenol. According to the present invention, only wax and the inorganic material are required. While the '305 Patent discloses additional materials, such as silica, calcium carbonate and the like for use as weighting agents, it has been found in the present invention that only the wax and the metal salt are required. There is no requirement for the polymeric materials and the composition of this invention is considered to be superior since it can be more readily controlled and removed without the polymeric materials.

U.S. Pat. No. 3,316,965 discloses a composition comprising blends of hydrocarbons and polymers. Similar considerations apply to this reference and in the present invention, only the wax and the metal salt are required.

U.S. Pat. No. 3,455,390 discloses a composition comprising a dispersion of finely divided oil soluble, water insoluble, solid particles in a liquid carrier. The water insoluble, solid particles may be oil soluble waxes in combination with a polymer of an olefin having between two and four carbon atoms, copolymers of a olefin having between two and four carbon atoms and an alkyl acrylate containing not more than four carbon atoms in the alkyl group and copolymers of a olefin having between two and four carbon atoms and copolymers of olefins having two and four carbon atoms and an ester formed by the reaction of acidic acid and unsaturated alcohol. Various preferred polymer components are listed. Again, the present invention is considered to be superior to the composition disclosed in this patent because of its simplicity and its effectiveness.

U.S. Pat. No. 1,165,476 discloses materials such as blends of waxes, eutectic compounds, salts and asphaltenes, which are soluble in crude oil, as flow restrictive means. These materials are disclosed for use in gravel slurrying and are disclosed to prevent premature liquid loss from a gravel slurry. These materials are also considered less suitable because of their complexity and because it is considered that the flexibility achievable by the use of the two component composition of the present invention is superior with respect to its removeability, effectiveness while in place and flexibility with respect to weighting.

The present invention comprises a simple, effective, highly flexible and economical method for treating a selected one of a plurality of formations having a gravel pack positioned over the formations. The present invention also provides an effective and economical method for selectively isolating a subterranean formation.

The present invention further comprises a composition for selectively isolating a selected subterranean formation behind a gravel pack.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for treating a selected one of a plurality of subterranean formations penetrated from an earth surface by a well with a gravel pack comprising gravel positioned around an outer circumference of the well and over the subterranean formations with a screen inside the gravel, the well further including a perforated base pipe in fluid communication with an inside of the screen and the earth surface, the method comprising:

a) positioning at least one packer in the base pipe to isolate at least the selected one of the subterranean formations;

b) positioning a quantity of a particulate mixture consisting essentially of a wax having a melting point above the treatment temperature of the selected subterranean formation and a finely-divided particulate metal salt, the mixture having a specific gravity greater than water above the at least one packer in an amount sufficient to deform outwardly over the at least one packer, through the perforations in the base pipe and into a gap between an outside of the perforated base pipe and the inside of the screen; and, c) injecting a quantity of a sealing agent sufficient to plug the gravel pack above the particulate mixture into the well and into the selected subterranean formation.

2. The method of claim 1 wherein two packers are used.

3. The method of claim 1 wherein the wax is selected from the group consisting of crystalline and microcrystalline petroleum waxes, beeswax, carnuba wax, condellia wax, monton wax, fully refined petroleum waxes, long chain aliphatic hydrocarbon and oxidized hydrocarbon waxes, Fischer-Tropsch waxes and synthetic waxes.

4. The method of claim 1 wherein the wax has a melting point at least 10° F. above the temperature of the selected formation.

5. The method of claim 1 the metal salt is selected from salts of Metals in Groups II, III, IV-A, V, VI, VII and VIII of the Periodic Table.

6. The method of claim 1 wherein the metal salt has a particle diameter size of no greater than about ⅜ inches.

7. The method of claim 6 wherein the metal salt is calcium carbonate.

8. The method of claim 1 wherein the wax has a melting point between about 125 and about 250° F.

9. The method of claim 1 wherein the mixture contains from about 5 to about 30 weight percent metal salt and from about 70 to about 95 weight percent wax.

10. A method for isolating a selected group of a plurality of subterranean formations penetrated from an earth surface by a well with a gravel pack comprising gravel positioned around an outer circumference of the well and over the subterranean formations with a screen inside the gravel, the well further including a perforated base pipe in fluid communication with an inside of the screen and the earth surface, the method comprising:
    a) positioning at least one packer in the base pipe to isolate at least the selected group of the subterranean formations; and,
    b) positioning a quantity of a particulate mixture consisting essentially of a wax having a melting point above the treatment temperature of the selected subterranean formation and a finely-divided particulate metal salt, the mixture having a specific gravity greater than water above the at least one packer in an amount sufficient to deform outwardly over the at least one packer, through the perforations in the base pipe and into a gap between an outside of the perforated base pipe and the inside of the screen; and
    c) injecting a quantity of sealing agent sufficient to plug the gravel pack above the particulate mixture into the well and into the selected subterranean formation.

11. The method of claim 10 wherein two packers are used.

12. The method of claim 10 wherein the wax is selected from the group consisting of crystalline and microcrystalline petroleum waxes, beeswax, carnuba wax, condellia wax, monton wax, fully refined petroleum waxes, long chain aliphatic hydrocarbon and oxidized hydrocarbon waxes, Fischer-Tropsch waxes and synthetic waxes.

13. The method of claim 10 wherein the wax has a melting point at least 10° F. above the temperature of the selected formation.

14. The method of claim 10 wherein the metal salt has a particle diameter size of no greater than about 3/8 inches.

15. The method of claim 10 wherein the metal salt is calcium carbonate.

16. The method of claim 10 wherein the wax has a melting point between about 125 and about 250° F.

17. The method of claim 10 wherein the mixture contains from about 5 to about 30 weight percent metal salt and from about 70 to about 95 weight percent wax.

* * * * *